United States Patent
Wakamatsu et al.

(10) Patent No.: US 10,352,218 B2
(45) Date of Patent: Jul. 16, 2019

(54) CATALYST ACTIVATION METHOD AND CATALYST ACTIVATION DEVICE

(71) Applicant: ISUZU MOTORS LIMITED, Shinagawa-ku, Tokyo (JP)

(72) Inventors: Toshitsugu Wakamatsu, Yokohama (JP); Yoshihisa Ueda, Fujisawa (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 0 days.

(21) Appl. No.: 15/566,335

(22) PCT Filed: Apr. 6, 2016

(86) PCT No.: PCT/JP2016/061289
§ 371 (c)(1),
(2) Date: Oct. 13, 2017

(87) PCT Pub. No.: WO2016/167167
PCT Pub. Date: Oct. 20, 2016

(65) Prior Publication Data
US 2018/0087424 A1    Mar. 29, 2018

(30) Foreign Application Priority Data
Apr. 14, 2015 (JP) .................. 2015-082385

(51) Int. Cl.
*F01N 3/20* (2006.01)
*B01D 53/86* (2006.01)
(Continued)

(52) U.S. Cl.
CPC ......... *F01N 3/208* (2013.01); *B01D 53/8631* (2013.01); *B01D 53/9495* (2013.01);
(Continued)

(58) Field of Classification Search
CPC ............. F02D 41/024; F02D 2041/026; F01N 3/2006; F01N 2900/1626
See application file for complete search history.

(56) References Cited

U.S. PATENT DOCUMENTS

2006/0130466 A1*  6/2006  Sisken ................. F01N 3/0231
                                                            60/295
2010/0122523 A1   5/2010  Vosz
(Continued)

FOREIGN PATENT DOCUMENTS

EP        2115282 A1    11/2009
JP        H07034918 A    2/1995
(Continued)

OTHER PUBLICATIONS

International Search Report and Written Opinion for related PCT application No. PCT/JP2016/061289 dated Jul. 5, 2016.
(Continued)

*Primary Examiner* — Jonathan R Matthias
(74) *Attorney, Agent, or Firm* — Procopio, Cory, Hargreaves & Savitch LLP

(57) ABSTRACT

A catalyst activation method and a catalyst activation device are provided which can activate a NOx catalyst efficiently in an ensured fashion. A plurality of accessories are connected to an internal combustion engine, and a control mechanism is provided on each of the accessories for controlling a load to be exerted on the internal combustion engine by driving the corresponding accessory. Then, a temperature of a NOx catalyst is acquired, and when the acquired temperature of the NOx catalyst is lower than a catalyst activation temperature, in order to drive additionally a certain number of accessories in the plurality of accessories which correspond to the temperature difference, the controlling mechanism(s) which corresponds to the accessory(ies) to be driven additionally is controlled to drive the corresponding accessory (ies) so as to increase a load to be exerted on the internal combustion engine.

8 Claims, 2 Drawing Sheets

(51) Int. Cl.
  *B01D 53/94* (2006.01)
  *F02D 41/02* (2006.01)
  *F02D 29/04* (2006.01)
  *F02D 29/06* (2006.01)

(52) U.S. Cl.
  CPC ............ *F01N 3/20* (2013.01); *F01N 3/2066* (2013.01); *F02D 41/024* (2013.01); *F02D 41/0255* (2013.01); *F01N 2390/02* (2013.01); *F01N 2900/1626* (2013.01); *F02D 29/04* (2013.01); *F02D 29/06* (2013.01); *F02D 2041/026* (2013.01); *F02D 2200/0802* (2013.01); *F02D 2250/24* (2013.01); *Y02T 10/26* (2013.01)

(56) References Cited

U.S. PATENT DOCUMENTS

| | | |
|---|---|---|
| 2016/0131059 A1 | 5/2016 | Tsurumi et al. |
| 2016/0244072 A1* | 8/2016 | Biagini ................... F02D 29/06 |

FOREIGN PATENT DOCUMENTS

| | | |
|---|---|---|
| JP | 2002089316 A | 3/2002 |
| JP | 2002276401 A | 9/2002 |
| JP | 2003206724 A | 7/2003 |
| JP | 2004-169711 A | 6/2004 |
| JP | 2005299513 A | 10/2005 |
| JP | 2005299555 A | 10/2005 |
| JP | 2010168972 A | 8/2010 |
| JP | 2010127084 A | 6/2012 |
| JP | 2015007422 A | 1/2015 |
| WO | 2008094116 A1 | 8/2008 |
| WO | 2008100284 A2 | 8/2008 |

OTHER PUBLICATIONS

Extended European Search Report for related EP App No. 16779958.4 dated Oct. 29, 2018, 8 pgs.

Office Action for corresponding CN Patent Application No. 201680021810.2, dated Mar. 1, 2019, in 15 pages.

* cited by examiner

CATALYST ACTIVATION METHOD AND CATALYST ACTIVATION DEVICE

CROSS-REFERENCE TO RELATED APPLICATIONS

This application is a U.S. National Stage entry of PCT Application No. PCT/JP2016/061289, filed on Apr. 6, 2016, which claims priority to Japanese Patent Application No. 2015-082385, filed Apr. 14, 2015, the contents of which are incorporated herein by reference.

TECHNICAL FIELD

The present invention relates to a catalyst activation method and a catalyst activation device for activating a selective catalytic reduction type NOx catalyst for purifying exhaust gas from an internal combustion engine.

BACKGROUND ART

A method for restricting an amount of intake air by controlling an intake throttle is known as a control method for increasing the temperature of exhaust gas.

According to the method described above, excessive air inside a cylinder can be reduced, whereby not only can the combustion temperature be increased, but also the temperature of exhaust gas can be increased.

PRIOR ART LITERATURES

Patent Literatures

Patent Literature 1: JP-A-2010-168972
Patent Literature 2: JP-A-2015-007422
Patent Literature 3: JP-A-2005-299513
Patent Literature 4: JP-A-2002-276401

SUMMARY OF THE INVENTION

Problem that the Invention is to Solve

Incidentally, a selective catalytic reduction type NOx catalyst (hereinafter, referred to as a NOx catalyst) is activated by increasing a temperature of the NOx catalyst to a predetermined catalyst activation temperature or higher. The temperature of exhaust gas may be increased by using the method described above so as to activate a NOx catalyst. However, a device is desired which can activate a NOx catalyst more efficiently in an ensured fashion.

Then, an object of the present invention is to provide a catalyst activation method and a catalyst activation device for activating a NOx catalyst efficiently in an ensured fashion.

Means for Solving the Problem

With a view to achieving the object, there is provided a catalyst activation method for activating a selective catalytic reduction type NOx catalyst for purifying exhaust gas from an internal combustion engine, wherein a plurality of accessories are connected to the internal combustion engine with a controlling mechanism provided on each of the accessories for controlling a load which is exerted on the internal combustion engine by driving the corresponding accessory, a temperature of the NOx catalyst is acquired, and when the acquired NOx catalyst temperature is lower than a catalyst activation temperature, in order to drive additionally a certain number of accessories in the plurality of accessories which correspond to a temperature difference between the acquired catalyst temperature and the catalyst activation temperature, the controlling mechanism which corresponds to the accessory to be driven is controlled to drive the corresponding accessory so as to increase a load to be exerted on the internal combustion engine.

MODE FOR CARRYING OUT THE INVENTION

Hereinafter, preferred embodiments of the present invention will be described in detail based on the accompanying drawings.

Figure 1:
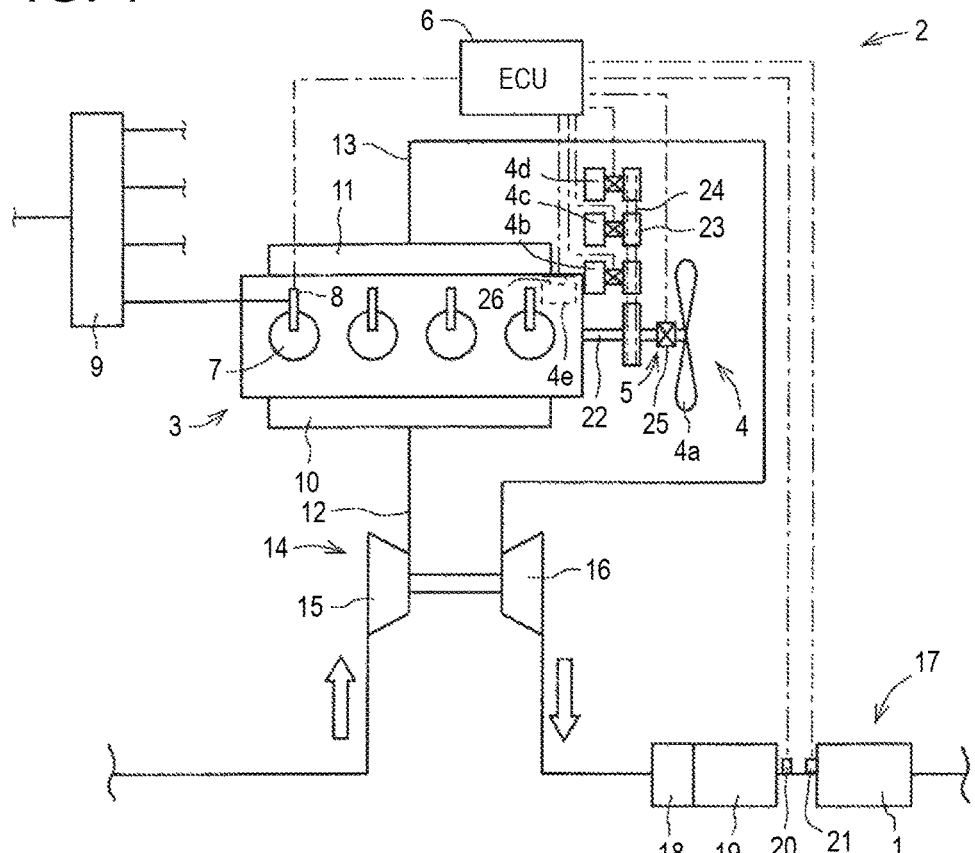
FIG. 1 is a schematic explanatory diagram of a catalyst activation device according to an embodiment of the present invention.

As shown in FIG. 1, a catalyst activation device 2 for activating a selective catalytic reduction type NOx catalyst 1 includes a plurality of accessories 4 which are connected to an internal combustion engine 3, a plurality of controlling mechanisms 5 which are provided individually on the accessories 4 for controlling a load which is exerted on the internal combustion engine 3 by driving the corresponding accessories 4, and a control unit 6 which is configured to acquire a temperature of the NOx catalyst and to, when the acquired NOx catalyst temperature is lower than a catalyst activation temperature, in order to drive additionally a certain number of accessories 4 in the plurality of accessories 4 which correspond to a temperature difference between the acquired catalyst temperature and the catalyst activation temperature, control the controlling mechanism 5 which corresponds to the accessory 4 to be driven to drive the corresponding accessory 4 so as to increase a load to be exerted on the internal combustion engine 3.

The internal combustion engine 3 is a diesel engine and is installed on a vehicle. The internal combustion engine 3 has a plurality of cylinders 7, and an injector 8 for injecting a diesel fuel such as diesel oil is provided on each of the cylinders 7. A common rail 9 is connected to the injectors 8. The common rail 9 supplies the diesel fuel to the injectors 8. The injectors 8 are electrically connected to the control unit 6 and inject the fuel at predetermined timings when the injectors 8 receive a command from the control unit 6.

The internal combustion engine 3 has an intake manifold 10 and an exhaust manifold 11, and an intake system 12 is connected to the intake manifold 10, while an exhaust system 13 is connected to the exhaust manifold 11.

A compressor 15 of a turbocharger 14 is provided on the intake system 12. The compressor 15 is designed to be driven by means of a rotational force from a turbine 16 of the turbocharger 14, which will be described later.

The turbine 16 of the turbocharger 14 and an exhaust purification device 17 are provided on the exhaust system 13. The turbine 16 is rotationally driven by means of exhaust gas.

The exhaust purification device 17 is provided on a portion of the exhaust system 13 which lies downstream of the turbine 16. The exhaust purification device 17 includes an oxidation catalyst 18, a DPF (a diesel particulate filter) 19 which is disposed on a downstream side of the oxidation catalyst 18 and a NOx catalyst 1 which is disposed on a downstream side of the DPF 19.

The oxidation catalyst 18 is formed of, for example, a ceramic carrier which carries a catalyst component on a surface thereof. The oxidation catalyst 18 oxidizes HC in exhaust gas to increase the temperature of the exhaust gas.

The DPF 19 has a porous bulkhead (not shown) and collects PM (particulate matter) in exhaust gas in fine holes and on a surface of the bulkhead.

The NOx catalyst 1 reduces and purifies NOx in exhaust gas using $NH_3$ (ammonia) which is produced from urea water supplied as a reduction agent. The NOx catalyst 1 is activated when a temperature of the NOx catalyst 1 is reached at a catalyst activation temperature (for example, 200° C.) or higher.

A urea water injector 20 and a temperature sensor 21 are provided on a portion of the exhaust system 13 which lies between the DPF 19 and the NOx catalyst 1.

The urea water injector 20 is connected to a urea water tank, not shown, and is designed to inject urea water sent from the urea water tank by receiving a signal from the control unit 6 as will be described later. The urea water injector 20 injects urea water into the exhaust system 13 to hydrolyze the injected urea water under high temperatures so as to produce $NH_3$.

The temperature sensor 21 is electrically connected to the control unit 6 and repeatedly detects a temperature at an entrance of the NOx catalyst 1 at a predetermined period of time. The temperature detected by the temperature sensor 21 is inputted into the control unit 6 in the form of an electric signal.

The plurality of accessories 4 are made up of a cooling fan 4a, a power steering pump 4b, an alternator 4c, an air conditioner compressor 4d and an oil pump 4e.

The cooling fan 4a, the power steering pump 4b, the alternator 4c and the air conditioner compressor 4d are connected individually to one another via a crankshaft 22 of the internal combustion engine 3, pulleys 23, a belt 24 and clutches 25 as a controlling mechanism 5. The clutches 25 are provided individually for the accessories 4 such as the cooling fan 4a, the power steering pump 4b, the alternator 4c and the air conditioner compressor 4d, and the individual accessories 4 are designed to be driven independently. The clutches 25 are made to transmit power in a partially engaged state. When referred to herein, the partially engaged state denotes a state in which a degree of power transmission, that is, an engagement ratio is in a range of greater than 0% to less than 100%. The clutches 25 are electrically connected to the control unit 6 so as to transmit power from the internal combustion engine 3 to the accessories 4 at arbitrary engagement ratios by receiving signals from the control unit 6. The cooling fan 4a, the power steering pump 4b, the alternator 4c and the air conditioner compressor 4d are driven by means of higher driving force from the internal combustion engine 3 as a result of the engagement ratios of the corresponding clutches 25 being increased, and a load borne by the internal combustion engine 3 is increased by means of the reaction force of the clutches 25. The cooling fan 4a, the power steering pump 4b, the alternator 4c and the air conditioner compressor 4d are driven by means of lower driving force from the internal combustion engine 3 as a result of the engagement ratios of the corresponding clutches 25 being lowered, and a load borne by the internal combustion engine 3 is decreased by means of the reaction force of the clutches 25. The clutches 25 may be such that only a complete engagement and a complete disengagement can be selected.

The oil pump 4e is made up, for example, of a variable capacity vane pump. An actuator 26 acting as the controlling mechanism 5 is provided on the variable capacity vane pump. The actuator 26 is used to increase and decrease the capacity of the oil pump 4e and is electrically connected to the control unit 6. The actuator 26 is designed to increase or decrease the capacity of the oil pump 4e at an arbitrary control ratio by receiving a signal from the control unit 6. When referred to herein, the control ratio denotes a percentage expressed based on the understanding that a control ratio at which the capacity of the oil pump 4e becomes maximum (the load of the internal combustion engine is maximum) is referred to as 100%, while a control ratio at which the oil pump 4e is stopped (the load of the internal combustion engine is 0) is referred to as 0%. The variable capacity vane pump is driven by means of higher driving force from the internal combustion engine 3 as a result of the control ratio of the actuator 26 increases, and the load of the internal combustion engine 3 is increased by means of the reaction force of the actuator 26. The variable capacity vane pump is driven by means of lower driving force as a result of the control ratio of the actuator 26 decreases, and the load of the internal combustion engine 3 is decreased by means of the reaction force of the actuator 26.

The control ratio of the actuator is allowed to change within a limited range from 100% to a control ratio corresponding to a minimum capacity of the oil pump 4e. The control unit 6 controls the actuator so as to act within this limited range of control ratio.

The accessories 4 and the control mechanisms 5 are not limited to those described above.

Figure 3:
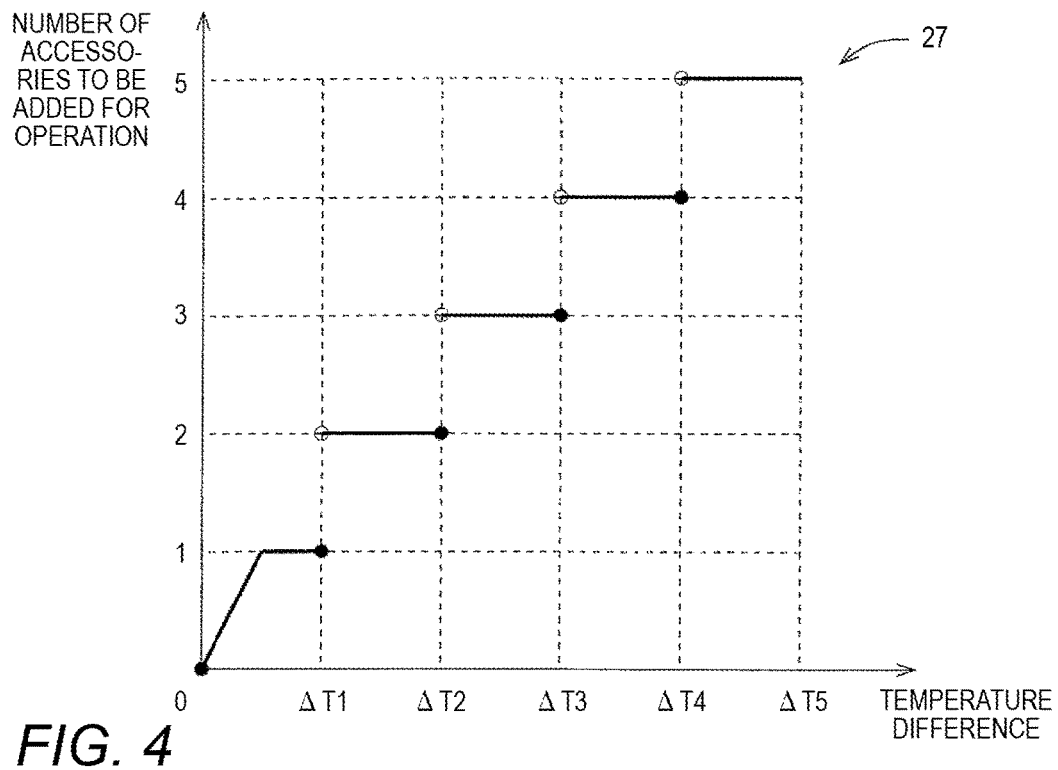
FIG. 3 is a map for use in the catalyst activation method illustrated in FIG. 2.

The control unit 6 is made up of an ECU (Engine Control Unit). An idle speed of the internal combustion engine 3, a catalyst activation temperature of the NOx catalyst 1 and a map 27 shown in FIG. 3 are stored in the control unit 6 in advance. As shown in FIG. 3, the map 27 represents a relationship between a difference between a catalyst activation temperature and a catalyst temperature (a temperature difference) and the number of accessories in the plurality of accessories 4 to be driven additionally (an increased number of accessories). In other words, the map 27 represents a relationship between the temperature difference and the clutch engagement ratio (the control ratio of the actuator 26) when the load of the internal combustion engine 3 is controlled by the accessory(ies) 4.

Figure 2:
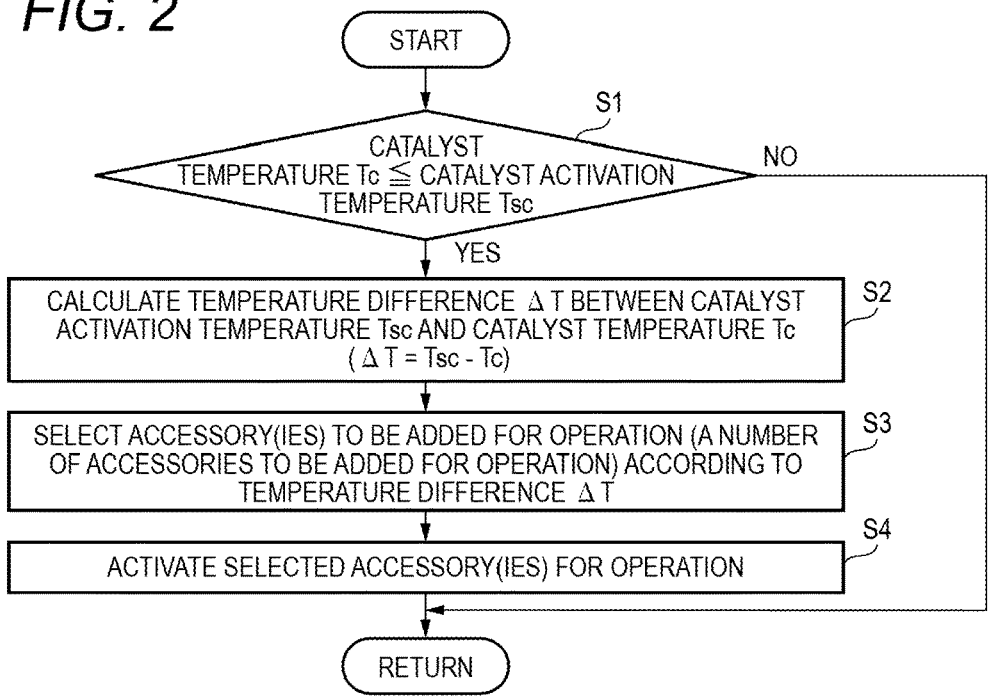
FIG. 2 is a flow chart which illustrates a catalyst activation method.

As shown in FIG. 2, the control unit 6 repeats a flow from step S1 to step S4 while a determination made in step S1 remains Yes. In step S1, a catalyst temperature Tc is compared with a catalyst activation temperature Tsc. Then, when the catalyst temperature Tc is equal to or lower than the catalyst activation temperature Tsc (Yes), the flow proceeds to step S2, whereas the flow ends in other conditions. The catalyst temperature Tc used in step S1 is obtained by the control unit 6 estimating a catalyst temperature Tc based on a detection value inputted from the temperature sensor 21.

In step S2, the control unit 6 calculates a temperature difference ΔT between the catalyst activation temperature Tsc and the catalyst temperature Tc using an expression ΔT=Tsc−Tc, whereafter the flow proceeds to step S3.

In step S3, the control unit 6 acquires the number of accessories 4 to be added for operation based on the temperature difference ΔT and the map 27 (refer to FIG. 3) and selects specifically the accessory(ies) to be added for operation from the plurality of accessories 4. Specifically speaking, the control unit 6 determines that the number of accessories to be added for operation is 0 when the temperature difference $\Delta T=0$, determines that the number of accessories to be added for operation is greater than 0 but is equal to or less than 1 when $0<\Delta T \leq \Delta T1$ (for example, when a value of the axis of ordinate corresponding to a value $\Delta T$ of the axis of abscissa is 0.5, the control unit 6 determines that the number of accessories to be added for operation is 0.5), determines that the number of accessories to be added for operation is 2 when $\Delta T1<\Delta T\leq \Delta T2$, determines that the number of accessories to be added for operation is 3 when $\Delta T2<\Delta T\leq\Delta T3$, determines that the number of accessories to be added for operation is 4 when $\Delta T3<\Delta T\leq\Delta T4$, and determines that the number of accessories to be added for operation is 5 when $\Delta T4<\Delta T$.

In selecting the accessory(ies) 4 to be added for operation in step 3, the accessory(ies) 4 is selected which have not yet been selected for operation for other controls. For example, in a case where an air conditioner has been activated by the user and is now being used, the air conditioner compressor 4d for the air conditioner is not selected.

A configuration may be adopted in which priority of selection is established among the accessories 4 and is then set in advance in the control unit 6, so that the accessories 4 are selected based on the priority of selection. Another configuration may be adopted in which no priority of selection of the accessories 4 is set, so that the accessories 4 are selected at random.

Thereafter, the flow proceeds to step S4, where the control unit 6 activates all the selected accessories 4 for operation. For example, when the control unit 6 determines in step S3 that the number of accessories 4 to be added for operation is 2 and the cooling fan 4a and the power steering pump 4b are selected as the accessories 4 to be added for operation, the clutch 25 corresponding to the cooling fan 4a is engaged at an engagement ratio of 100% and the clutch 25 corresponding to the power steering pump 4b is engaged at an engagement ratio of 100%. In addition, when the control unit 6 determines in step S3 that the number of accessories 4 to be added for operation is 0.3 and the cooling fan 4a is selected as the accessory 4 to be added for operation, the clutch 25 corresponding to the cooling fan 4a is engaged at an engagement ratio of 30%.

The control unit 6 has an idle speed control function to increase or decrease an amount of fuel injected from the injectors 8 so as to maintain the idle speed of the internal combustion engine 3 when an accelerator pedal, not shown, is not depressed. The idle speed control function is executed in parallel to the catalyst activating function described above.

Next, the function of this embodiment will be described.

When the internal combustion engine 3 is cold started, the control unit 6 keeps the internal combustion engine 3 idling until the accelerator pedal is depressed. Idling is executed by controlling the fuel injection amount so that the engine revolution speed is kept at the idle speed.

As shown in FIG. 2, the control unit 6 executes the operation in step S1 in parallel to keeping the internal combustion engine 3 idling. As this occurs, the control unit 6 acquires an estimated value of the catalyst temperature Tc and compares the catalyst temperature Tc with the catalyst activation temperature Tsc. Since the catalyst temperature Tc resulting immediately after the start of the internal combustion engine 3 remains at the ambient temperature, the catalyst temperature Tc is lower than the catalyst activation temperature Tsc. Because of this, the determination made in step S1 becomes Yes, and the control unit 6 executes the operation in step S2. The control unit 6 calculates the temperature difference $\Delta T$ between the catalyst temperature Tc and the catalyst activation temperature Tsc in step S2. Thereafter, the control unit 6 executes the operation in step S3. The control unit 6 acquires the number of accessories 4 to be driven additionally based on the temperature difference $\Delta T$ and the map 27 (refer to FIG. 3) in step S3.

Here, for example, when the temperature difference $\Delta T$ is greater than $\Delta T3$ but is equal to or less than $\Delta T4$, the control unit 6 acquires 4 as the number of accessories to be added for operation from the map 27. Thereafter, the control unit 6 searches for the accessories 4 which have not yet been activated for operation, selects specifically the four accessories 4 from the accessories 4 which are not in operation, and engages the clutches 25 which correspond to the selected accessories 4 to 100%.

Thereafter, the control unit 6 executes the operation in step S4. For example, when the cooling fan 4a, the power steering pump 4b, the alternator 4c and the air conditioner compressor 4d are selected as the accessories 4 to be added for operation in step S3, the control unit 6 engages 100% the clutches 25 corresponding to these four accessories 4. By doing so, the cooling fan 4a, the power steering pump 4b, the alternator 4c and the air conditioner compressor 4d are activated for operation, whereby the load of the internal combustion engine 3 is increased. At the same time, the control unit 6 increases the fuel injection amount so that the engine revolution speed is kept at the idle speed. By doing so, the temperature of exhaust gas from the internal combustion engine 3 is increased, which then increases the temperature of the NOx catalyst 1.

The control unit 6 repeats cyclically the operations in steps S1 to S4 until the catalyst temperature Tc becomes higher than the catalyst activation temperature Tsc. When the temperature difference $\Delta T$ stays within the same range as that resulting when the operation in step S4 was executed in the previous cycle, the accessories 4 which were in operation in the previous cycle continue to be operated.

When the catalyst temperature Tc increases as time elapses, whereby the temperature difference $\Delta T$ becomes greater than $\Delta T2$ to be equal to or smaller than $\Delta T3$, the control unit 6 acquires 3 as the number of accessories to be added for operation from the map 27. Thereafter, the control unit 6 selects specifically three accessories 4 in the four currently operating accessories 4 as accessories 4 to be kept operating. For example, when the cooling fan 4a, the power steering pump 4b, and the alternator 4c are selected as the accessories 4 to be kept operating in step S3, the control unit 6 decreases the engagement ratio of the clutch 25 which corresponds to the air conditioner compressor 4d to 0%.

The control unit 6 repeats similar operations and stops the accessories 4 one by one as the catalyst temperature Tc increases. Then, for example, when the control unit 6 acquires 0.3 as the number of accessories to be added for operation from the map 27 with only one accessory 4 kept operating, the control unit 6 decreases the engagement ratio of the clutch 25 which corresponds to the accessory 4 kept operating to 30% to engage the clutch 25 partially.

Thereafter, when the catalyst temperature Tc becomes equal to the catalyst activation temperature Tsc, the control unit 6 acquires 0 as the number of accessories to be added for operation from the map 27 in step S3 and decreases the engagement ratio of the clutch 25 which corresponds to the accessory 4 kept operating to 0% so as to stop the accessory 4.

In the description made heretofore, the catalyst activation is described as being controlled during idling. However, the same catalyst activation control is performed even while the accelerator pedal is being depressed.

In this way, when the catalyst temperature Tc is lower than the catalyst activation temperature Tsc, in order to drive additionally the number of accessories 4 which corresponds to the temperature difference ΔT, the controlling mechanism(s) 5 which corresponds to the accessory(ies) 4 to be driven additionally is controlled to drive the accessory(ies) 4 to be driven additionally so as to increase the load of the internal combustion engine 3. Thus, when the temperature difference ΔT is great, the catalyst temperature Tc can be increased quickly by exerting a great load on the internal combustion engine 3, and as the temperature difference ΔT decreases, the number of accessories 4 to be kept operating can be decreased, thereby making it possible to activate the NOx catalyst 1 efficiently in an ensured fashion. Additionally, even in such a state that the accelerator pedal is not operated due to the user taking a little nap during idling, the load of the internal combustion engine 3 can be increased, so that the temperature of the NOx catalyst 1 can be increased quickly to the catalyst activation temperature.

In addition, at least one of the plurality of controlling mechanisms 5 is the clutch 25. When the clutch 25 is controlled to drive the corresponding accessory, since the clutch 25 is partially engaged, not only the load of the internal combustion engine 3 can be controlled more accurately, but also the deterioration in fuel economy due to application of an excessive load can be suppressed.

Figure 4:
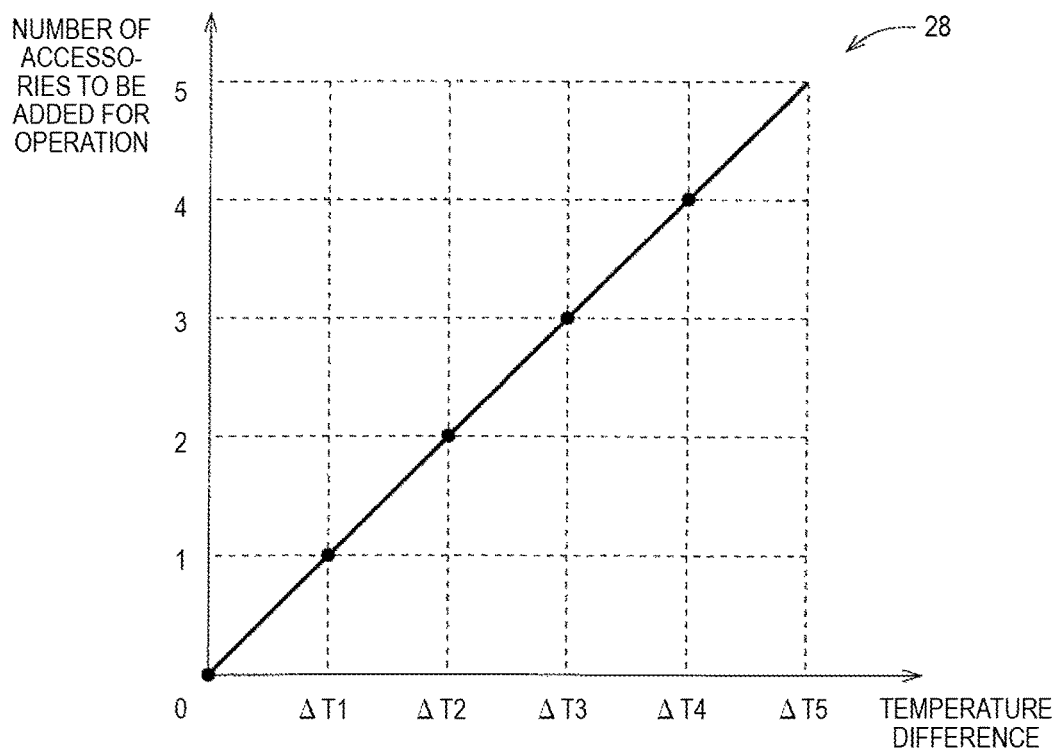
FIG. 4 is a diagram showing a map according to another embodiment.

The map is not limited to the map described above. For example, as shown in FIG. 4, a map 28 may be adopted in which the number of accessories to be added for operation which corresponds to the temperature difference ΔT is expressed by a numeral including a decimal place even when the number of accessories to be added for operation is greater than 1. In this case, the individual clutches 25 should be controlled by dividing the engagement ratios of the clutches 25 so that the number of accessories to be added for operation is equal to a sum of the engagement ratios of all the clutches 25 which are engaged (or the control ratio of the actuator 26). For example the engagement ratio of the clutch 25 which corresponds to one of the accessories 4 is set at an engagement ratio of less than 100% so that the clutch 25 is engaged partially, and the engagement ratio of the clutch 25 corresponding to the other accessory 4 or the control ratio of the actuator 26 should be set at 100%. Alternatively, the engagement ratios of the clutches 25 corresponding to the plurality of accessories 4 or the control ratio of the actuator 26 may be set at less than 100%.

The invention claimed is:

1. A catalyst activation method for activating a selective catalytic reduction type NOx catalyst of a catalyst activation device for purifying exhaust gas from an internal combustion engine, the catalyst activation device including a plurality of accessories, which are connected to the internal combustion engine, and a plurality of controlling mechanisms which are provided individually on the accessories and capable of transmitting power from the internal combustion engine to the accessory at an arbitrary engagement ratio to control a load which is exerted on the internal combustion engine by driving each of the accessories, the method comprising:
    acquiring a temperature of the NOx catalyst;
    driving additionally a certain number of accessories in the plurality of accessories which correspond to a temperature difference between the acquired temperature of the NOx catalyst and a catalyst activation temperature of the NOx catalyst to increase the load to be exerted on the internal combustion engine when the acquired temperature is lower than the catalyst activation temperature; and
    controlling the engagement ratio of the controlling mechanism corresponding to at least one accessory to be driven according to the number of accessories corresponding to the temperature difference, for the number of accessories being a positive value including a non-zero value after a decimal point.

2. The catalyst activation method according to claim 1, wherein at least one of the plurality of controlling mechanisms is made up of a clutch, and in controlling the clutch so as to drive the corresponding accessory, the clutch is partially engaged according to the engagement ratio.

3. The catalyst activation method according to claim 2, wherein the plurality of accessories include at least two in a cooling fan, a power steering pump, an alternator, an air conditioner compressor and an oil pump.

4. The catalyst activation method according to claim 1, wherein the plurality of accessories include at least two in a cooling fan, a power steering pump, an alternator, an air conditioner compressor and an oil pump.

5. A catalyst activation device for activating a selective catalytic reduction type NOx catalyst for purifying exhaust gas from an internal combustion engine, the device comprising:
    a plurality of accessories which are connected to the internal combustion engine;
    a plurality of controlling mechanisms which are provided individually on the accessories and capable of transmitting power from the internal combustion engine to the accessory at an arbitrary engagement ratio to control a load which is exerted on the internal combustion engine by driving each of the accessories; and
    a control unit configured to:
        acquire a temperature of the NOx catalyst;
        drive additionally a certain number of accessories in the plurality of accessories which correspond to a temperature difference between the acquired temperature of the NOx catalyst and a catalyst activation temperature of the NOx catalyst to increase the load to be exerted on the internal combustion engine when the acquired temperature is lower than the catalyst activation temperature; and
        control the engagement ratio of the controlling mechanism corresponding to at least one accessory to be driven according to the number of accessories corresponding to the temperature difference, for the number of accessories being a positive value including a non-zero figure after a decimal point.

6. The catalyst activation device according to claim 5, wherein at least one of the plurality of controlling mechanisms is made up of a clutch, and in controlling the clutch so as to drive the corresponding accessory, the control unit controls the clutch so as to be partially engaged according to the engagement ratio.

7. The catalyst activation device according to claim 6, wherein the plurality of accessories include at least two in a cooling fan, a power steering pump, an alternator, an air conditioner compressor and an oil pump.

8. The catalyst activation device according to claim 5, wherein the plurality of accessories include at least two in a cooling fan, a power steering pump, an alternator, an air conditioner compressor and an oil pump.

* * * * *